United States Patent
Bueser et al.

(10) Patent No.: US 6,209,527 B1
(45) Date of Patent: Apr. 3, 2001

(54) PRESSURE REGULATING VALVE

(75) Inventors: Wolfgang Bueser, Freiberg; Michael Niederkofler, Sachsenheim; Willi Strohl, Beilstein; Jochen Rose, Hemmingen; Erich Eiler, Sersheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/920,362

(22) Filed: Aug. 29, 1997

(30) Foreign Application Priority Data

Aug. 29, 1996 (DE) ............................................. 196 34 899

(51) Int. Cl.⁷ .................................................. F02M 37/04
(52) U.S. Cl. .................. 123/514; 123/506; 137/543.23; 137/539
(58) Field of Search ..................................... 123/497, 506, 123/514, 460; 137/514.7, 118.06, 539, 543.19, 543.23

(56) References Cited

U.S. PATENT DOCUMENTS

| 2,388,406 | * | 11/1945 | Haberland | 137/543.23 |
| 2,667,893 | * | 2/1954 | Kupiec | 137/514.7 |
| 4,365,648 | * | 12/1982 | Grothe | 137/539 |
| 4,503,885 | * | 3/1985 | Hall | 137/569 |
| 4,700,741 | * | 10/1987 | Murphy | 137/539 |
| 4,859,155 | * | 8/1989 | Laqua | 137/514.7 |
| 5,065,790 | * | 11/1991 | Kornas | 137/539 |
| 5,456,283 | * | 10/1995 | Schap | 137/514.7 |
| 5,462,413 | * | 10/1995 | Schroeder | 137/543.23 |
| 5,560,343 | * | 10/1996 | Werkman | 123/514 |
| 5,623,910 | * | 4/1997 | Riggle | 123/497 |

FOREIGN PATENT DOCUMENTS

4231731A1  7/1993 (DE).

* cited by examiner

*Primary Examiner*—Carl S. Miller
(74) *Attorney, Agent, or Firm*—Michael J. Striker

(57) ABSTRACT

A pressure regulating valve has a valve chamber having an inlet for connecting to a pressure source, a discharge chamber communicating through a valve opening with the valve chamber, a valve member, a valve seat surrounding the valve opening, a valve closing spring which presses the valve member against the valve seat with an adjustable spring force, and a throttling surface arranged downstream of the valve opening so that between the valve member and an inner wall of the discharge chamber, a pressure is formed at the valve member which counteracts the spring force.

8 Claims, 3 Drawing Sheets

PRESSURE REGULATING VALVE

BACKGROUND OF THE INVENTION

The present invention relates to pressure regulating valve.

Pressure regulating valves operate in a fuel injection system of internal combustion engines with fuel pumps preferably arranged in a fuel tank for regulation of a system pressure.

A known pressure regulating valve of this type in a fuel supply system for internal combustion engine is disclosed in the German patent document DE 42 31 731 A1. In this pressure regulating valve, the valve closing spring is supported between the valve member and an adjusting screw which is screwed at the end side in the control chamber, so that the spring force of the valve closing spring and thereby the fuel pressure regulated by the pressure regulating valve in a discharge can be adjusted. When the fuel pressure applied in the valve chamber of the fuel pump reaches an opening pressure provided by the spring force F of the valve closing spring and the cross-section A of the valve opening, the valve member is lifted from the valve seat and controls so much overflow quantity Q that the regulating pressure $p_r=F/A$ is adjusted. The regulating pressure $p_r$ depends from the throughflow quantity Q, since with increasing throughflow quantity Q the stroke of the valve member is increased and thereby the spring force F is increased due to the spring strength of the valve closing spring. The characteristic line $p_r(Q)$ of the pressure regulating valve which exhibits the operational dependency of the regulating pressure $p_r$ from the discharge quantity, has thereby an increase. In other words, the regulating pressure increases with the throughflow quantity.

SUMMARY OF THE INVENTION

Accordingly, it is an object of the present invention to provide a pressure regulating valve which avoids the disadvantages of the prior art.

In keeping with these features and with others which will become apparent hereinafter, one feature of present invention resides, briefly stated in a pressure regulating valve, in which downstream of the valve opening a throttle surface is arranged so that between the valve member and the inner wall of the control chamber, a pressure at the valve member which counteracts the spring pressure is provided.

When the pressure regulating valve is designed in accordance with the present invention, a throughflow-dependent intermediate pressure is produced at the throttle surface, which compensates the spring force increase, so that the characteristic line increase at least in the working region of the pressure regulating valve is substantially equal to zero.

By corresponding design of the valve opening, spring force of the valve closing spring, and its spring rigidity as well as the valve member diameter and the size of the throttle surface, both the regulating pressure and the steepness of the characteristic line of $p_r(Q)$ is determined within predetermined limits.

If the steepness of the characteristic line is made approximately zero, then the pressure regulated by the pressure regulating valve is completely independent from the throughflow quantity and is exclusively dependent from the adjusted spring force of the valve closing spring.

It is to be understood that due to corresponding design also the characteristic line can be obtained with a negative pitch, so that, as desired in specific application, with the increasing throughflow quantity the pressure regulated by the pressure regulating valve is reduced.

In accordance with a preferable embodiment of the invention, for forming the throttle surface, a guiding gap is provided between the valve member and the chamber wall of the control chamber. The throttle surface is then provided by a ring gap surface formed because of the guiding gap between the valve member and the chamber wall. Due to the required size of the throttle surface, a guiding gap can be obtained which can result in a poor guidance of the valve member on a chamber wall of the control chamber. This is avoided when in accordance with a preferable embodiment of the present invention, the chamber wall of the control chamber is provided with radially projecting axial ribs which are spaced from one another and form axial guides for the valve member so as to simultaneously provide an exact measurement for the required throttle surface. In this case, the throttle surface is determined by the sum of the intermediate space cross-section between the axial ribs.

If the valve member is guided on the chamber wall of the control chamber and the guiding gap dimensioned exclusively with consideration of the operational safety of the pressure regulating valve, then in accordance with an advantageous embodiment of the present invention, a throttle opening is provided in the chamber wall of the control chamber and opens inside the control chamber in the region between the valve seat and a guiding surface formed on the valve member. A throttle surface is represented by the opening cross-section, while additionally because of the guiding gap between the valve member and the chamber wall, the ring gap surface must be provided.

Since in the inventive pressure regulating valve, the valve stroke and thereby the spring force with the conventionally used helical pressure spring and valve closing spring increase linearly with the throughflow quantity Q, which increases by the intermediate pressure produced by the throttle surface squarely with the throughflow quantity, a characteristic line increase can be provided near zero only within a predetermined quantity region for the throughflow quantity. By the above mentioned design of the different sizes, such as valve opening, valve member diameter, spring force and spring rigidity of the valve closing spring and the throttle surface, it is however possible to select this quantity range so that it corresponds to the working region of the regulating valve. A characteristic line increase which is exactly zero is provided when in accordance with a preferable embodiment of the invention a valve closing spring is used with a progressive spring characteristic line or alternatively the throttle surface is changed in dependence on the stroke of the valve member.

In accordance with a preferable embodiment of the present invention, the valve member is connected with a vibration damper for avoiding vibrations of the valve member. Such a vibration damper can be realized in a simple manner when in accordance with a further embodiment of the present invention a damping piston is arranged in a dead space communicating with a valve chamber and having a defined gap distance to a dead space wall, and fixedly connected to a connecting rod with the valve member. During the stroke of the valve member and thereby a connected stroke of the damping piston, the displaced liquid quantity must be pressed through a ring gap between the damping piston and the dead space wall so that a greater damping action is obtained with a faster stroke movement of the damping piston. For slower movement, the damping force is quasi zero so that the type of damping does not influence the hysteresis of the regulation negatively. For the selection of the piston diameter and the ring gap between the damping piston and the dead chamber wall, the damping action of the vibration damper can be adjusted to the conditions provided by the vibration conditions of the valve member.

In accordance with a preferable embodiment of the present invention, the valve chamber is formed as a diameter-reducing opening portion of a stepped opening which is provided in the valve body and ends blindly. The supply and withdrawal portions are realized by two radial openings extending radially to the opening axis. In the diameter-increasing opening portion, a control chamber is provided with a closing cap, in which a cap bottom of the valve closing with a valve seat is formed. The dead chamber for receiving the damping piston is formed as a non-round depression at the opening bottom of the stepped opening.

The connecting rod which is fixedly connected either with the valve member or with the damping piston carries an outer threaded portion which is screwed in a threaded opening of either the damping piston or the valve member. The valve closing spring is formed as a helical pressure spring between the cup bottom and the damping piston. Due to this construction of the pressure regulating valve, a very low structural height is obtained. The spring force of the valve closing spring is adjusted by turning of the valve member. Thereby the distance between the cup bottom and the damping piston changes in dependence on the rotary direction. Due to the non-round depression which receives the damping piston, a co-rotation of the damping piston during turning of the valve member is reliably prevented.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
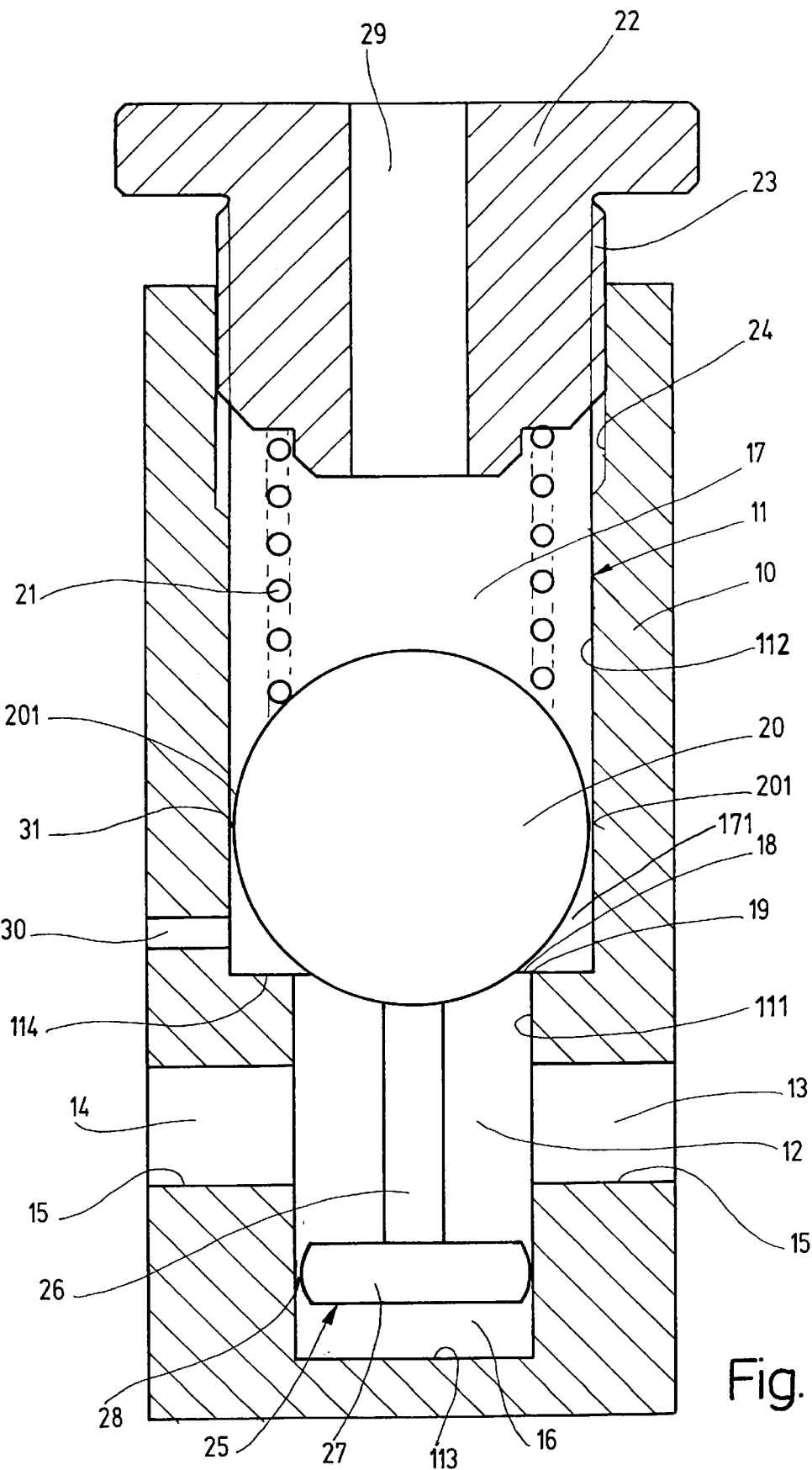
FIGS. 1–3 are views showing a longitudinal section of a pressure regulating valve in accordance with the present invention, in three different modifications and schematically.

A pressure regulating valve shown in a longitudinal section in FIG. 1 has a valve body 10 with a stepped opening 11 which is formed as a blind hole. The stepped opening 11 has a diameter-reduced opening portion 111 which forms a valve chamber 12 with an inlet 13 and an outlet 14. They are formed as a radial opening 15 which extends radially to an axis of the stepped opening 11. The radial opening 15 opens in an axial distance from an opening base 113 so that a dead chamber 16 is provided between the mouths of the radial opening 15 in the opening portion 111 and the opening base 13. The inlet 13 is provided for connection to a pressure source, while the outlet 14 is provided to a pressure conduit. During use of the pressure regulating valve in a fuel injection system for internal combustion engines, the regulating valves together with an electrical fuel supply pump is arranged in a fuel tank of a motor vehicle. The inlet 13 is connected with an outlet of the feed pump, while the outlet 14 is connected with a fuel conduit leading to a fuel injection device.

A diameter reduced opening portion 112 forms a control chamber 17 which is connected through a valve opening 18 with the valve chamber 12. The valve opening 18 is surrounded by a valve seat 19 which is formed on a ring shoulder 114 of the stepped opening 11 between the opening portions 111 and 112. A valve member 20 cooperates with the valve seat 19 and is formed as a ball. It is pressed by a valve closing spring 21 to the valve seat 19.

The valve member 20 is guided on an inner wall of the control chamber 17, or in other words on the opening wall of the diameter-reduced opening portion 112, with a guiding gap which is selected so that an unobjectional operation of the pressure regulating valve is guaranteed. The valve closing spring 21 is formed as a helical pressure spring which is supported against the valve member 20 and an adjusting screw 22, which is screwable with an outer thread portion 23 in an inner thread portion 24 of an opening portion 112 which is cut at one side. By more or less strong insertion of the adjusting screw 22, the spring force of the valve closing member 32 can be adjusted. The adjusting screw 22 has a throughgoing central opening 29, through which the control chamber 13 in the arrangement of the pressure regulating valve in the fuel pump of a motor vehicle communicates with the interior of the fuel pump, so that the control chamber 17 is always tilled with fuel.

A vibration damper 25 is connected with the valve member 20. It is formed by a damping piston 26 which is fixedly connected by a connection rod 26 with the valve member 20. The damping piston 26 is arranged in a dead chamber 16 with a gap distance from the inner wall of the dead chamber 16. During the stroke movement of the valve member 20, the damping piston 26 is displaced and thereby the fluid quantity is pumped through the surrounding gap 28 between the damping piston 27 and the inner wall of the dead chamber 16, therefore the stroke movement of the valve member 20 is slower. The damping action of the vibration damper 25 is greater with increase of the speed of stroke movement of the valve member 20.

When the pressure in the valve chamber 12 reaches an opening pressure of the valve determined by the spring force F of the valve closing spring 21 and the valve opening 18, the ball-shaped valve member 20 is lifted from the valve seat 19 and controls so much overflow quantity Q that in the valve chamber 12 the pressure $p_r=F/A$ is adjusted. For counteracting the growth of the regulating pressure $p_r$ with increasing throughflow quantity Q, since with increasing throughflow quantity Q the stroke of the valve member 20 and thereby the spring force F is increased, a throttle surface is arranged downstream of the valve opening 18. Therefore between the valve member 20 and the wall of the control chamber an intermediate pressure counteracting the spring force at the valve member 20 is formed. For this purpose a throttle opening 30 is provided in the valve member 10 and passes through the chamber wall of the control chamber 17. It opens in the region between the valve seat 19 and the guiding surface 201 formed on the valve member 20. With this guiding surface 201, the ball-shaped valve member 20 is axially displaceable guided on the inner wall of the control chamber 17 with a guiding gap. It is selected so that the operational safety of the valve is guaranteed. Thereby a ring gap 31 is formed between the guiding surface 201 on the valve member 20 and the inner wall of the control chamber 17. The throttle opening 30 and the ring gap 31 together form the above mentioned throttle surface downstream of the valve opening 18. Therefore through it, the discharging quantity Q which discharges through the open valve seat 19 is subjected to a second throttling, and thereby an intermediate pressure is formed between the inner wall of the control chamber 17 and the valve member 20 in a partial chamber 171. It counteracts the spring force F of the valve closing member 21 and also is greater with increase in the discharge quantity Q. With the valve member 20 formed as a ball, the intermediate pressure acts on the ring surface of the ball produced by the ball diameter with respect to the diameter of the valve opening 18 or the inner diameter of the valve seat 19. The selection of the valve opening 18, the spring force and the spring strength of the valve closing spring 21, the ball diameter and the cross-section of the throttle opening 30 with consideration of the ring surface of the ring gap 31 between the ball 20 and the inner wall of the control chamber, can determine both the regulation pressure $p_r$ as well as the steepness of the characteristic line $p_r(Q)$ within certain limits. Thereby it is provided that within the working region of the pressure regulating valve, the ascentl of the characteristic line $p_r(Q)$ is approximately zero.

In accordance with an alternative embodiment of the above described pressure regulating valve, the pressure opening 30 can be dispensed with for realization of the throttle surface, when the guiding gap between the valve member 20 and the inner wall of the control chamber 17 is selected so that a corresponding throttling surface is formed by the size of the ring gap 31. This however can lead to a worse guidance of the valve member 20 in the control chamber 17 so that the operational safety of the pressure regulating valve in extreme cases can be no longer guaranteed.

Figure 2:
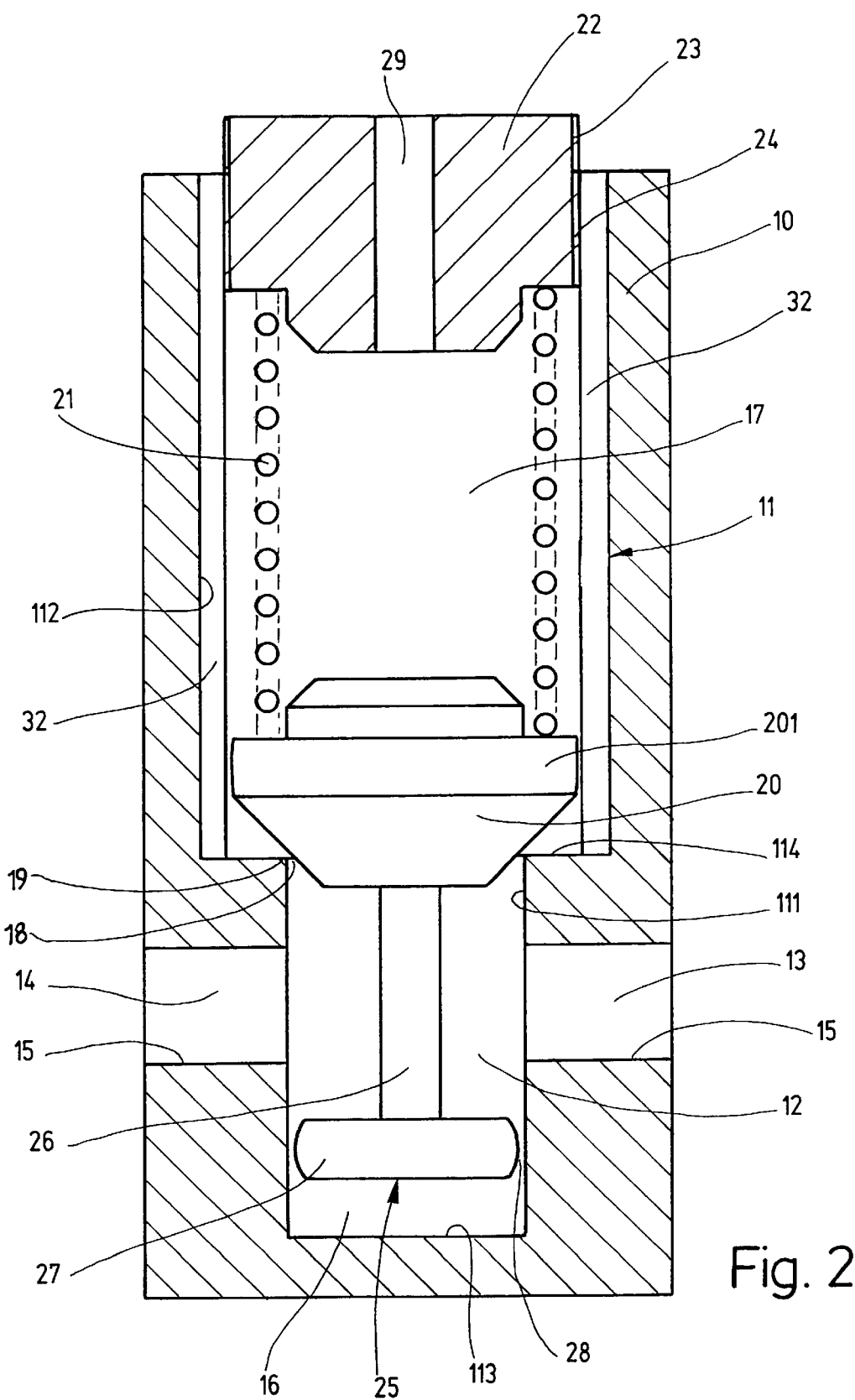

A modification of the above described pressure regulating valve helps this issue, as shown in the embodiment of FIG. 2. The valve member 20 which is formed here as a cone with a cylindrical guiding surface 201 is not directly guided on the inner wall of the control chamber 17. Instead, it is arranged between the back of axial ribs 32 which extend radially from the inner wall of the control chamber 17 and simultaneously distributed over the periphery of the inner wall. The throttling surface for producing the intermediate pressure which acts on the valve member 20 and counteracts the spring force of the valve closing member is here determined as a sum of the intermediate chamber cross-section between the axial ribs 32. By the corresponding selection of the axial ribs 32 or the intermediate space between the axial ribs 32, here also the spring force increase during the stroke of the valve member 20 can be compensated so that the characteristic line increase $p_r(Q)$ in the working region of the pressure regulating valve is quasi equal zero. In other aspects the pressure regulating valve of FIG. 2 substantially corresponds to the pressure regulating valve of FIG. 1, and the same components are identified with the same reference numerals.

Figure 3:
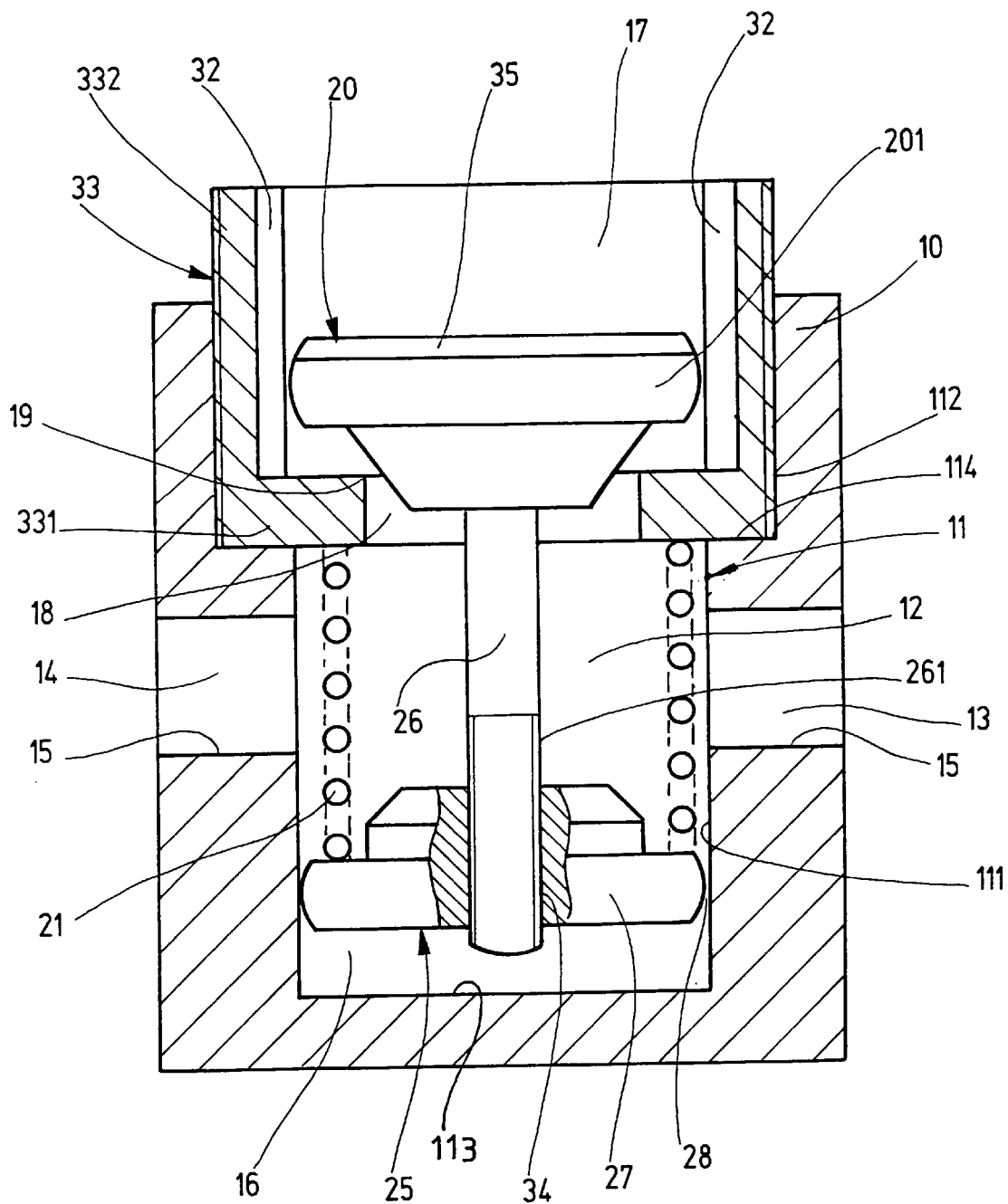

The pressure regulating valve which is provided with the axial ribs 32 in the control chamber 17 for forming the above described throttling surface downstream of the valve member 18 is designed as shown in FIG. 3 so that, when compared with the embodiment of FIG. 2, it has a very compact construction and extremely small structural height. The valve member 12 in the valve body 10 is also formed by the diameter-reduced opening portion 111 of the blind stepped opening 11. Both the inlet 13 and the outlet 14 formed by radial openings open into the opening portion 111. A housing cup 33 which closes the control chamber 17 is inserted in the diameter-reduced opening portion 112 of the stepped opening 11. The housing cup 33 is screwed either in the opening portion 112 or pressed and abuts with its cup bottom 331 against a ring shoulder 114 between both opening portions 111 and 112. The valve opening 18 is formed with the surrounding valve seat 19 in the cup bottom 331 and the axial guidance for the valve member is guaranteed by the axial ribs 32 which are arranged on the inner wall of the cylindrical cup part 333 at the same peripheral distances from one another. The intermediate spaces between the axial ribs 32 form the throttling surface for producing the intermediate pressure which compensates the spring force increase during the valve member stroke.

The damping piston 27 has a threaded opening 34, and the connecting rod 26 which is fixedly connected to the valve member 20 carries a threaded portion 261 which is screwed in the threaded opening 34 in the damping piston 27. A valve closing spring 21 formed as a helical pressure spring abuts between the damping piston 27 and the cup bottom 331 of the housing cup 33. The dead chamber 16 is formed as a non-round, for example a hexagonal depression near the opening wall 113 of the stepped opening 11. The correspondingly shaped damping piston 27 is received in it and is axially displaceable under leading a surrounding gap 21, but is inserted non-rotatably. At the side which faces away from the valve seat 19, the valve member 20 is provided with a slot 35 in which a rotary tool can be inserted. By turning the valve member 20, the spring force of the valve closing member 21 can be adjusted. When the pressure regulating valve is mounted in the fuel tank for an internal combustion engine with a fuel injection, the control chamber 17 communicates directly with the tank and is filled with fuel.

The rotation of the valve member 20 and the damping piston 27 relative to one another and vice versa can be provided when the connecting rod 26 is fixedly connected with the damping piston 27, and is screwed with an outer threaded portion into a threaded opening in the valve member 20. Further modifications are also possible. For example the valve closing spring 21 with a progressive spring characteristic line can be provided, so that there is a possibility to obtain a characteristic line increase of the valve characteristic line $p_r(Q)$ of exact zero over a great characteristic line region. The same can be also obtained when the throttling surface for producing the intermediate pressure at the valve member 20 is controlled independently from the stroke of the valve member 20.

Furthermore, in the above described pressure regulating valve the discharge 14 in the valve body 10 which leads to the valve chamber 12 can be dispensed with. In this case, through the valve chamber 12 a total fuel quantity supplied by the fuel pump no longer passes, but instead only a fuel quantity controlled through the valve opening 18 or a discharge quantity passes.

The adjustment of the spring force of the valve closing spring 21 can be performed instead of the adjusting screw 22 of FIGS. 1 and 2, also by other adjusting means. For example the adjustment can be performed by a metal plate cup which is pressed in the opening portion 112 so that the valve closing spring 21 abuts against the cup. For adjustment of the spring force, it is pressed to different depths in the opening portion 112.

It will be understood that each of the elements described above, or two or more together, may also find a useful application in other types of constructions differing from the types described above.

While the invention has been illustrated and described as embodied in pressure regulating valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A pressure regulating valve for regulating a flow of fuel, comprising means forming a valve chamber having an inlet for connecting to a pressure source; means forming a discharge chamber communicating through a valve opening with said valve chamber; a valve member arranged so that fuel to be regulated flows around said member; a valve seat surrounding said valve opening, a valve closing spring which presses said valve member against said valve seat with an adjustable spring force; and a throttling surface arranged downstream of said valve opening so that between said valve member and an inner wall of said discharge chamber, a pressure is formed at said valve member which counteracts said spring force, said valve member being guided on an inner wall of said discharge chamber with a guiding gap which is dimensioned for an operationally safe guidance and has a narrow tolerance, said wall of said control chamber having a throughgoing throttling opening which opens in a region between said valve seat and a guiding surface formed on said valve member, said throttling surface being formed as a surface sum of an opening cross-section of a throttling opening and a ring surface of a ring formed by a guiding gap between said valve member and said inner wall of said discharge chamber.

2. A pressure regulating valve for regulating a flow of fuel, comprising means forming a valve chamber having an inlet for connecting to a pressure source; means forming a discharge chamber communicating through a valve opening with said valve chamber; a valve member arranged so that fuel to be regulated flows around said member; a valve seat surrounding said valve opening, a valve closing spring which presses said valve member against said valve seat with an adjustable spring force; and a throttling surface arranged downstream of said valve opening so that between said valve member and an inner wall of said discharge chamber, a pressure is formed at said valve member which counteracts said spring force; and a vibration damper connected with said valve chamber.

3. A pressure regulating valve for regulating a flow of fuel, comprising means forming a valve chamber having an inlet for connecting to a pressure source; means forming a discharge chamber communicating through a valve opening with said valve chamber; a valve member arranged so that fuel to be regulated flows around said member; a valve seat surrounding said valve opening, a valve closing spring which presses said valve member against said valve seat with an adjustable spring force; and a throttling surface arranged downstream of said valve opening so that between said valve member and an inner wall of said discharge chamber, a pressure is formed at said valve member which counteracts said spring force, said throttling surface being formed so that in a valve working region an increase of a valve characteristic line $p_r(Q)$ is at least approximately zero, wherein p is a regulating pressure, and Q is a discharge quantity flowing through said valve opening.

4. A valve as defined in claim 1, wherein said valve closing spring is formed as a spring having a progressive spring characteristic line.

5. A valve as defined in claim 1, wherein said throttling surface is formed so that it is controlled independently from a stroke of a valve member.

6. A valve as defined in claim 2, wherein said vibration damper has a damping piston which is arranged in a dead chamber communicating with said valve chamber with a predetermined gap distance from a wall of said dead chamber; and a connecting ring which connects said damping piston with said valve member.

7. A pressure regulating valve for regulating a flow of fuel, comprising means forming a valve chamber having an inlet for connecting to a pressure source; means forming a discharge chamber communicating through a valve opening with said valve chamber; a valve member arranged so that fuel to be regulated flows around said member; a valve seat surrounding said valve opening, a valve closing spring which presses said valve member against said valve seat with an adjustable spring force; and a throttling surface arranged downstream of said valve opening so that between said valve member and an inner wall of said discharge chamber, a pressure is formed at said valve member which counteracts said spring force, said valve member being guided on an inner wall of said discharge chamber, said throttling surface being formed by a ring surface of a ring gap formed by a guiding gap between said valve member and a wall of said discharge chamber.

8. A pressure regulating valve for regulating a flow of fuel, comprising means forming a valve chamber having an inlet for connecting to a pressure source; means forming a discharge chamber communicating through a valve opening with said valve chamber; a valve member arranged so that fuel to be regulated flows around said member; a valve seat surrounding said valve opening, a valve closing spring which presses said valve member against said valve seat with an adjustable spring force; and a throttling surface arranged downstream of said valve opening so that between said valve member and an inner wall of said discharge chamber, a pressure is formed at said valve member which counteracts said spring force, said discharge chamber having an inner wall with a plurality of extending axial ribs which are spaced from one another, so that said valve member is guided between backs of said ribs, said throttling surface being formed as a sum of cross-sections of intermediate chambers between said axial ribs.

* * * * *